United States Patent Office 2,718,495
Patented Sept. 20, 1955

2,718,495
PHOTOCHEMICAL PREPARATION OF SATURATED NITROHYDROCARBON SULFONYL CHLORIDES

Joachim Dazzi, Dayton, Ohio, assignor to Monsanto Chemical Company, St. Louis, Mo., a corporation of Delaware No Drawing. Application January 23, 1950, Serial No. 140,158

8 Claims. (Cl. 204—158)

This invention relates to a new process for the preparation of saturated nitrohydrocarbon sulfonyl chlorides by the action of a mixture of chlorine and sulfur dioxide upon a saturated nitrohydrocarbon in the presence of ultra-violet radiation.

Gold 2,467,028, relates to the preparation of nitroalkane sulfonyl chlorides, wherein a sulfonic acid salt residue of a salt of nitroalkane sulfonic acid containing a primary sulfonate group is converted to a sulfonyl chloride derivative by treatment with a reagent, such as phosphorus pentachloride, phosphorus trichloride, or phosphorus oxychloride, preferably in equimolar ratios, but an excess of the chloride reagent can be employed. This process is complicated and expensive in view of the several steps required to convert the nitroalkane to the sulfonyl chloride derivative.

Reed 2,046,090, relates to the process of treating hydrocarbons with a mixture of sulfur dioxide and chlorine to yield chlorinated and sulfochlorinated derivatives thereof. Numerous other references are in the prior art relating to modifications of this general process. Most of these references pertain to the preparation of sulfonyl chloride derivatives of various types of hydrocarbons.

It has been reported that methane could not be sulfochlorinated under the above conditions (PB Report No. 52004, page 72). Kharasch et al. (JACS 62—2393-7) reports that acetic acid can not be sulfonated by a photochemical induced sulfuryl chloride reaction procedure.

It has now been found that saturated nitrohydrocarbons, as for example nitromethane, nitroethane, nitropropane, 2-nitropropane, nitrocyclohexane, etc. may be readily sulfochlorinated by the action of a mixture of chlorine and sulfur dioxide in the presence of ultra-violet radiation. The saturated nitrohydrocarbons containing up to 16 carbon atoms are preferred and more especially preferred are the compounds containing up to 10 carbon atoms. It was found that the reaction was equally applicable to the single carbon containing nitro derivative, nitromethane, in contradistinction to the prior art failures to sulfochlorinate methane and acetic acid.

The reaction product contains chlorinated nitrohydrocarbons in addition to the sulfochlorinated derivative. The yield of the latter may be improved by controlling the conditions of sulfochlorination as hereinafter more fully pointed out.

By the term "saturated nitrohydrocarbon" is meant the saturated nitroalicyclic and saturated nitroacyclic or nitroalkane compounds.

The following examples are illustrative of the invention:

Example 1

A 1-liter, 4-necked, round-bottomed Pyrex glass flask was fitted to receive: (1) a mechanically driven stirrer, (2) thermometer, (3) combination inlet and outlet tube and (4) a source of ultra-violet radiation. The inlet tube terminated in a sintered glass gas disperser at the bottom of the flask. This gas inlet tube was connected to the source of chlorine and sulfur dioxide through a Y tube, individual flow meters and reduction valves. A General Electric U type ultra-violet lamp was provided with a standard tapered stopper such that the lamp could be inserted into the flask while maintaining a tight gas-proof seal.

A 201.8 g.-sample of nitromethane was introduced into the flask, agitation started, and chlorine and sulfur dioxide were respectively introduced at a constant rate of 5 and 6 liters per hour. The temperature was maintained at about 30 to 32° C. throughout the 3.33 hours reaction time by maintaining the flask in a water bath such that the heat of reaction would be rapidly dissipated. The source of radiation was discontinued after 3.33 hours and dry nitrogen gas bubbled through the reaction mixture for several minutes to sweep out the unreacted sulfur dioxide and chlorine, and the hydrogen chloride formed during the process. The reaction mixture was then cooled down to 0° C. and dry ammonia gas bubbled through the reaction mixture for about 3 minutes to neutralize any residual hydrogen chloride by the formation of ammonium chloride which readily crystallizes out and is removed by filtration. The product was found to contain substantially nitromethane sulfonyl chloride. The yield was 53 percent.

Example 2

The same apparatus as used in Example 1 was employed for the following experiment. A 375.3 g.-sample of nitroethane was introduced into the flask and chlorine and sulfur dioxide were respectively introduced at the rate of 6 and 7 liters per hour. The temperature was held at 20 to 25° C. for 6.5 hours after which time the radiation was terminated and dry nitrogen gas bubbled through the agitated reaction mixture for 15 minutes. The product was substantially 1-nitroethane-1-sulfonyl chloride. The yield was 58.5 percent.

A similar experiment to the above was run using 450.4 g. of nitroethane and allowing a reaction time of 11.5 hours. The yield was 77.3 percent.

Example 3

A 534 g.-sample of 2-nitropropane was introduced into the apparatus of Example 1. The rate of gas introduction was 6 to 6.5 and 7 liters per hour, respectively, for chlorine and sulfur dioxide. The reaction was continued for 6.75 hours at a temperature of 20 to 25° C. The reaction mixture was then swept for 15 minutes with dry nitrogen gas. The reaction product was substantially 2-nitropropane-2-sulfonyl chloride obtained in an approximate 64 percent yield.

The reaction mixture is readily separated by fractional distillation under reduced pressure, preferably less than 5 mm. of mercury.

The above products have exhibited good stability on normal storage for a period of greater than one year.

A considerable degree of latitude may be realized in carrying out the above examples. The mixed gases may be passed through a gas mixing chamber prior to introduction to the reaction vessel. Also the gases may be introduced separately but no advantage is observed in so doing. To obtain more favorable yields of the desired sulfonyl chloride derivative, a molar excess of sulfur dioxide over chlorine should be maintained at all times. This excess should be of the order of at least 5 to 10 percent, however greater amounts of sulfur dioxide may be employed without detrimental effects. The reaction temperature should be preferably maintained at from about 15 to 35° C. to provide conditions favoring sulfochlorination. The reaction time will vary depending on the ratio of the rate of mixed gas introduction to the total saturated nitrohydrocarbon present, the design of the reaction vessel, as well as the relative intensity of the source of radiation.

The reaction mixture may be blown with other inert gases than nitrogen to sweep out the unreacted chlorine and sulfur dioxide, as well as the hydrogen chloride formed during the reaction. The purging of the system of hydrogen chloride may be supplemented by a short reaction time with dry ammonia or other alkaline medium; however, care must be exercised to prevent loss of the sulfonyl chloride derivative. The reaction system and products must be substantially free of water which would cause hydrolysis of the sulfonyl chloride and promote corrosive conditions in the processing equipment. The latter is, however, relatively unimportant since preferably the process equipment should be acid resistant.

The saturated nitrohydrocarbon may be diluted by a solvent such as carbon tetrachloride to lower the ultimate concentration of sulfonyl chloride derivative. The sulfonyl chloride radical tends to be highly absorptive of short wave length radiation; hence, excessive concentrations tend to inhibit further reaction of the nitrohydrocarbon with the mixed sulfur dioxidechlorine gases. The process may also be conducted on a continuous basis with the same end in view.

The saturated nitrohydrocarbon sulfonyl chlorides are useful in the preparation of chemical intermediates, pharmaceuticals, insecticides, and plasticizers; in the treatment of rubber, leather, paper, and oil; and for application as solvents.

I claim:

1. The process for the preparation of nitroalkane sulfonyl chlorides comprising the reaction of a nitroalkane containing up to six carbon atoms with a gaseous mixture of sulfur dioxide and chlorine wherein the sulfur dioxide is maintained in at least a 5 percent molar excess over the chlorine, in the presence of ultra-violet radiation.

2. The process of claim 1 wherein the temperature is maintained at from about 15 to about 35° C.

3. The process of claim 2 wherein the nitroalkane is nitromethane.

4. The process of claim 2 wherein the nitroalkane is nitroethane.

5. The process of claim 2 wherein the nitroalkane is 1-nitropropane.

6. The process of claim 2 wherein the nitroalkane is 2-nitropropane.

7. The process for the preparation of saturated nitrohydrocarbon sulfonyl chlorides comprising the reaction of a saturated nitrohydrocarbon containing up to 6 carbon atoms with a gaseous mixture of sulfur dioxide and chlorine, wherein the sulfur dioxide is maintained in at least a 5 per cent molar excess over the chlorine, in the presence of ultra-violet radiation and at a temperature of from about 15 to about 35° C.

8. The process for the preparation of nitrocyclohexane sulfonyl chloride comprising the reaction of nitrocyclohexane with a gaseous mixture of sulfur dioxide and chlorine wherein the sulfur dioxide is maintained in at least a 5 per cent molar excess over the chlorine, in the presence of ultraviolet radiation and at a temperature of from about 15 to about 35° C.

References Cited in the file of this patent

UNITED STATES PATENTS

| | | |
|---|---|---|
| 2,193,824 | Lockwood et al. | Mar. 19, 1940 |
| 2,202,791 | Fox et al. | May 28, 1940 |
| 2,333,788 | Holbrook et al. | Nov. 9, 1943 |
| 2,528,320 | Roberts et al. | Oct. 31, 1950 |